United States Patent [19]
Jacquet

[11] Patent Number: 6,074,596
[45] Date of Patent: Jun. 13, 2000

[54] METHOD AND APPARATUS FOR MAKING AN OBJECT OF A PLASTIC MATERIAL

[75] Inventor: Gaston Jacquet, Dortan, France

[73] Assignee: Grosfillex S.A.R.L., Oyonnax, France

[21] Appl. No.: 09/108,268

[22] Filed: Jul. 1, 1998

[30] Foreign Application Priority Data

Jul. 4, 1997 [FR] France ................... 97 08485

[51] Int. Cl.⁷ ................................. B29C 49/18
[52] U.S. Cl. ................ 264/529; 264/533; 264/540; 425/525; 425/530; 425/532
[58] Field of Search ................ 425/525, 522, 425/526, 530, 532; 264/529, 528, 533, 540

[56] References Cited

U.S. PATENT DOCUMENTS

| | | | |
|---|---|---|---|
| 3,672,799 | 6/1972 | Liebertz et al. | 264/529 |
| 4,120,927 | 10/1978 | Nielsen | 425/530 |
| 4,348,167 | 9/1982 | Virog, Jr. | 425/530 |
| 4,510,116 | 4/1985 | Peters et al. | 425/530 |
| 4,529,570 | 7/1985 | Przytulla | 425/525 |
| 5,052,626 | 10/1991 | Wood et al. | 264/528 |
| 5,253,996 | 10/1993 | Moore | 425/525 |
| 5,466,413 | 11/1995 | Richter et al. | 425/526 |
| 5,571,474 | 11/1996 | Przytulla | 425/525 |

FOREIGN PATENT DOCUMENTS

| | | |
|---|---|---|
| 704379 | 4/1996 | European Pat. Off. . |
| 1349584 | 12/1963 | France . |

*Primary Examiner*—Robert Davis
*Attorney, Agent, or Firm*—Wolf, Greenfield & Sacks, P.C.

[57] ABSTRACT

The apparatus has means (10, 11) for placing a parison (12) between two portions of a blow mold (14, 16). The parison (12) is put on the head of a blowpipe (32) placed between the two mold portions. On closing the mold, the top end of the parison is pinched in a top region of the mold and the bottom end of the parison is clamped against the blowpipe (32). A pre-blow step is performed on the parison to obtain an envelope which is then turned over by moving the blowpipe (32) upwards together with a turnover piston (34, 36), prior to performing a final blow step.

16 Claims, 8 Drawing Sheets

METHOD AND APPARATUS FOR MAKING AN OBJECT OF A PLASTIC MATERIAL

The present invention relates to a method of manufacturing a container-forming object out of plastics material, in which a parison of plastics material is made, said parison is inserted into a blow mold having at least two mold portions suitable for being moved relative to each other to open and close the mold, a blow step is performed in the mold, and a turnover step is performed by moving a turnover piston inside the mold to obtain a container-forming object with a free edge that presents a turnover.

A method of that type is known from French patent No. 1 349 584. In that document, the parison is inserted through the top of the mold and its bottom end is pinched with pinching edges fitted to the top end of the turnover piston, and similarly the top end of the parison is pinched by pinching edges fitted to the top end of the mold. The blowpipe is inserted via the top end of the mold, piercing the parison. The bottom end of the parison is cut simultaneously with being pinched by the pinching edges of the turnover piston. The plastics material in the region of the bottom end of the parison is stretched to a very great extent. Insofar as turning over is subsequently performed from said bottom end, the stretching created by the pinching gives rise to considerable weakness which can lead to the parison being torn while being turned over. The method disclosed in that document is usable in practice only for products of small dimensions, where the stroke of the turnover piston is small enough to prevent it giving rise to any tears in the parison. In addition, the thickness of the parison is relatively great relative to the dimensions of the object being manufactured.

European application 0 704 379 discloses a method of manufacturing blown plastic barrels, in which the parison is inserted between the two open mold portions and is placed on a blowpipe. The two portions of the turnover piston are clamped against the blowpipe during closure of the two mold portions, thereby pinching the parison.

In this situation, a first blow operation is performed to expand the parison completely, giving it the shape of the mold cavity, i.e. pressing it against the wall of the cavity, in particular in the annular region around the piston (a pause of about 2 seconds is then implemented).

Thereafter, a second blow operation is performed during which the turnover piston is raised a short distance, of the order of 6.5 cm (2.65 inches).

Finally a third and last blow operation is performed.

The barrels formed in that way have walls that are very thick. In addition, the displacement of the turnover piston serves to form an extremely strong, solid external ring.

That method is not usable for manufacturing objects that form common consumer containers, for example plant pots.

The cost price of such objects must be very low, thereby requiring relatively little plastics material to be used. In other words, the wall of the parison is considerably thinner than the wall in European application 0 704 379.

In addition, for such consumer objects, the portion of the parison that is turned over by the piston serves to form a turnover which gives a hand-hold and also a sensation of apparent thickness. The length of the turnover must be sufficient for this purpose.

To be sure of giving this sensation of thickness, the turnover must not be solid, nor must it be flattened against itself as in European application 0 704 379.

If the method of European application 0 704 379 were to be used for objects forming thin-walled containers (e.g. of ordinary thickness of about 2 mm), with a long turnover, then the parison would tear in the region of the turnover.

The invention seeks to remedy the above drawbacks by proposing an improved method in which any risk of the parison tearing is avoided, particularly during the turnover step.

This object is achieved by the fact that the parison is inserted into the open mold by placing the bottom end of said parison on the head of a blowpipe situated between the two spaced-part mold portions, by the fact that the two mold portions are moved towards each other to close the mold at least substantially, the parison is pinched in the top region of the mold, and the bottom end of said parison is clamped against the blowpipe in the bottom region of the mold, by the fact that in said situation a pre-blow step is performed to obtain a pre-blown envelope having at least a portion of its periphery in the vicinity of the walls of the mold without being pressed thereagainst, said pre-blown envelope having a bottom end portion in the vicinity of the top end of the turnover piston while being remote from the walls of the mold, by the fact that the turnover step is performed by displacing the blowpipe together with the piston upwards to turn the bottom end of the pre-blown envelope over onto itself, and by the fact that, after the turnover step, a final blow step is performed to obtain a blown envelope having the shape of the container-forming object.

It will be understood that insofar as the bottom end of the parison is placed on the head of the blowpipe, the inside dimension of the parison when it is inserted in the mold fits around the outline of the blowpipe. Contrary to the disclosure of French patent No. 1 349 584, the parison is not pinched by being closed onto itself, so its outside dimensions are not suddenly decreased. In addition, the parison is not pinched but is merely pressed against the blowpipe. As a result the plastics material constituting the parison is not compressed, and for this reason also no zone of major stretching is created. In European application 0 704 379, no precautions are taken to avoid the parison being compressed against the blowpipe.

In the invention, the parison is clamped onto the blowpipe just enough to obtain sufficient sealing to enable the parison to be blown inside the mold.

In addition, the turnover step is performed while the envelope is in the pre-blown state only, i.e. before it has completely taken up the shape of the mold cavity. As a result, firstly the plastics material constituting the envelope does not run the risk of cooling by excessive contact with the walls of the mold, so it is still sufficiently "malleable" to be turned over. Secondly, turning over begins to be performed while the wall of the envelope has not reached the minimum thickness it would have reached if, as in French patent No. 1 349 584 or as in European application 0 704 379, it had been pressed against the wall of the cavity by being constrained to occupy the greatest possible volume inside the cavity.

Advantageously, during the pre-blow step, the mold is left in an unlocked state, an air exhaust gap being left between the mold portions.

It is also advantageous to connect the space inside the envelope to an air exhaust duct during the turnover step to avoid the envelope being pressed too quickly against the walls of the mold, particularly in the region where the piston is displaced. Connection to an air exhaust duct (controlled by a processor or via a calibrated valve) makes it possible to avoid exceeding a predetermined pressure inside the envelope, in spite of the decrease in volume due to the displacement of the piston.

Advantageously, a turnover piston is used having two portions disposed around the blowpipe and displaceable relative to each other. Thus, when the parison is inserted in the mold, the two portions of the piston are held apart, thereby leaving a substantially annular space between the pipe and said portions of the piston, and the bottom end of the parison is placed on the top of the blowpipe by inserting said bottom end in said space. Thereafter, the two portions of the piston are moved towards each other to press them against the blowpipe and thus clamp the bottom end of the parison thereto.

By means of these dispositions, the bottom end of the parison which is clamped to provide sealing during blowing is located in the annular space between the two portions of the piston and the blowpipe. During the turnover step, this bottom end naturally remains held between the two portions of the piston and said blowpipe and is not directly stretched by the vertical displacement of the piston, since the blowpipe and the piston move together. Consequently, even if the clamping is a little too hard and starts to compress the plastics material, and even if this compression locally weakens the plastics material constituting the parison, it will under no circumstances cause the envelope to tear.

In an advantageous variant, a turnover piston is used comprising a piston portion in the shape of a hollow cylinder, the blowpipe being disposed in the hollow of said portion, and at least one of the two elements constituted by the head of the blowpipe and by said hollow has diametral dimensions that taper going upwards. When the parison is inserted in the mold, the blowpipe is held in a low position in which a substantially annular space is left between the head of said blowpipe and the wall of said hollow, and the bottom and of the parison is placed on the head of the blowpipe by inserting said bottom end into said space. Thereafter the blowpipe is raised in the hollow of the piston portion to clamp the bottom end of the parison between the wall of the hollow and the head of the blowpipe.

The invention also provides apparatus for manufacturing a container-forming object out of plastics material, the apparatus comprising means for making a parison of plastics material, a blow mold having at least two portions suitable for being moved relative to each other to open and close the mold, means for inserting the parison into the mold, a blowpipe, and a turnover piston suitable for being moved inside the mold to form a turnover in the region of the free edge of the container-forming object.

French patent No. 1 349 584 discloses apparatus in which the top end of the turnover piston is fitted with pinching edges which together pinch the parison against itself. As mentioned above, this pinching and the resulting cutting of the parison give rise to greater weakness in the parison, specifically in the zone which is subsequently subjected to the greatest stretching stresses since it is in this zone that turning over takes place.

The apparatus disclosed in European application 0 704 379 serves to perform blowing in three steps to make barrels. Immediately after the first step, the parison is fully pressed against the walls of the mold. Such apparatus cannot be used for manufacturing objects forming thin-walled containers having a long turnover.

The invention seeks to provide improved apparatus enabling the above-mentioned drawbacks to be avoided.

This object is achieved by the fact that the blowpipe is disposed beneath the means for inserting the parison into the mold and is to be found between the two mold portions, the blowpipe having a blowpipe head suitable for receiving the bottom end of the parison when the mold is open, by the fact that the apparatus includes means for pinching the parison in the top region of the mold, and means for clamping the bottom end of said parison against the blowpipe in the bottom region of the mold, by the fact that the blowpipe is suitable for being used to perform a pre-blow step so as to obtaining a pre-blown envelope having at least a portion of its periphery in the vicinity of the walls of the mold which is at least substantially closed, but without being pressed against said walls, said envelope having a bottom end portion in the vicinity of the top end of the turnover piston while being at a distance from the walls of the mold, by the fact that the blowpipe is suitable for being moved upwards together with the piston to turn the bottom end portion of the pre-blown envelope over onto itself, and by the fact that the blowpipe is suitable for being used to perform a final blow step in such a manner as to obtain a blown envelope having the shape of the container-forming object.

It will be understood that because of these dispositions, the bottom end of the parison is placed on the head of the blowpipe. The parison is generally obtained by extrusion, directly above the mold, and is tubular in shape. Thus, the bottom end of the parison fits over the head of the blowpipe, i.e. said head is engaged inside the parison. As a result the parison can be clamped simply against the blowpipe by means provided for this purpose to obtain sufficient sealing of the parison for blowing purposes. There is no need to pinch the bottom end of the parison against itself, which in the prior art leads to excessive compression and stretching, thus running the risk of weakness. In addition, the fact that the blowpipe can be used for performing the pre-blow step prior to the turnover step makes it possible to perform the turnover step at a stage when the envelope has been pre-blown only and is therefore easier to deform without running the risk of tearing.

The blowpipe is connected to a source of air under pressure which is activated to perform the pre-blow step and the blow step. The displacements of the various elements of the apparatus are controlled in such a manner that the displacement of the piston for turning-over purposes does not begin until the envelope has reached its pre-blown state.

Preferably, to compensate for the decrease in the volume of the inside space of the envelope during turning over, said inside space is connected to decompression means while the piston is rising, which amounts to performing a decompression step simultaneously with the turnover step. The final blow step is performed after the turnover step when the mold is fully locked.

In an advantageous variant, the turnover piston has two portions disposed around the blowpipe, said two portions being suitable for being spaced apart to leave a substantially annular space around the blowpipe suitable for receiving the bottom end of the parison when it is placed on the head of the blowpipe, and suitable for being moved towards each other to clamp the bottom end of the parison against said blowpipe.

In this case, advantageously, each of the two portions of the turnover piston has a clamping member, said clamping members together forming a clamping ring which projects towards the blowpipe to clamp the bottom end of the parison against said blowpipe.

In another advantageous variant, the turnover piston has a piston portion in the form of a hollow cylinder, the blowpipe being disposed in the hollow of said portion, and at least one of the two elements constituted by the head of the blowpipe and by said hollow has diametral dimensions that taper upwards. The blowpipe is capable of occupying a low position in which an annular space is provided between said head and the wall of the hollow in said piston portion, which space is suitable for receiving the bottom end of the parison when the parison is placed on the head of the blowpipe, and the blowpipe is also suitable for occupying a high position in said hollow so as to clamp the bottom end of the parison between the wall of said hollow and said head of the blowpipe.

The invention will be well understood and its advantages will appear more clearly on reading the following detailed description of embodiments given as non-limiting examples. The description refers to the accompanying drawings, in which.

Figure 1:
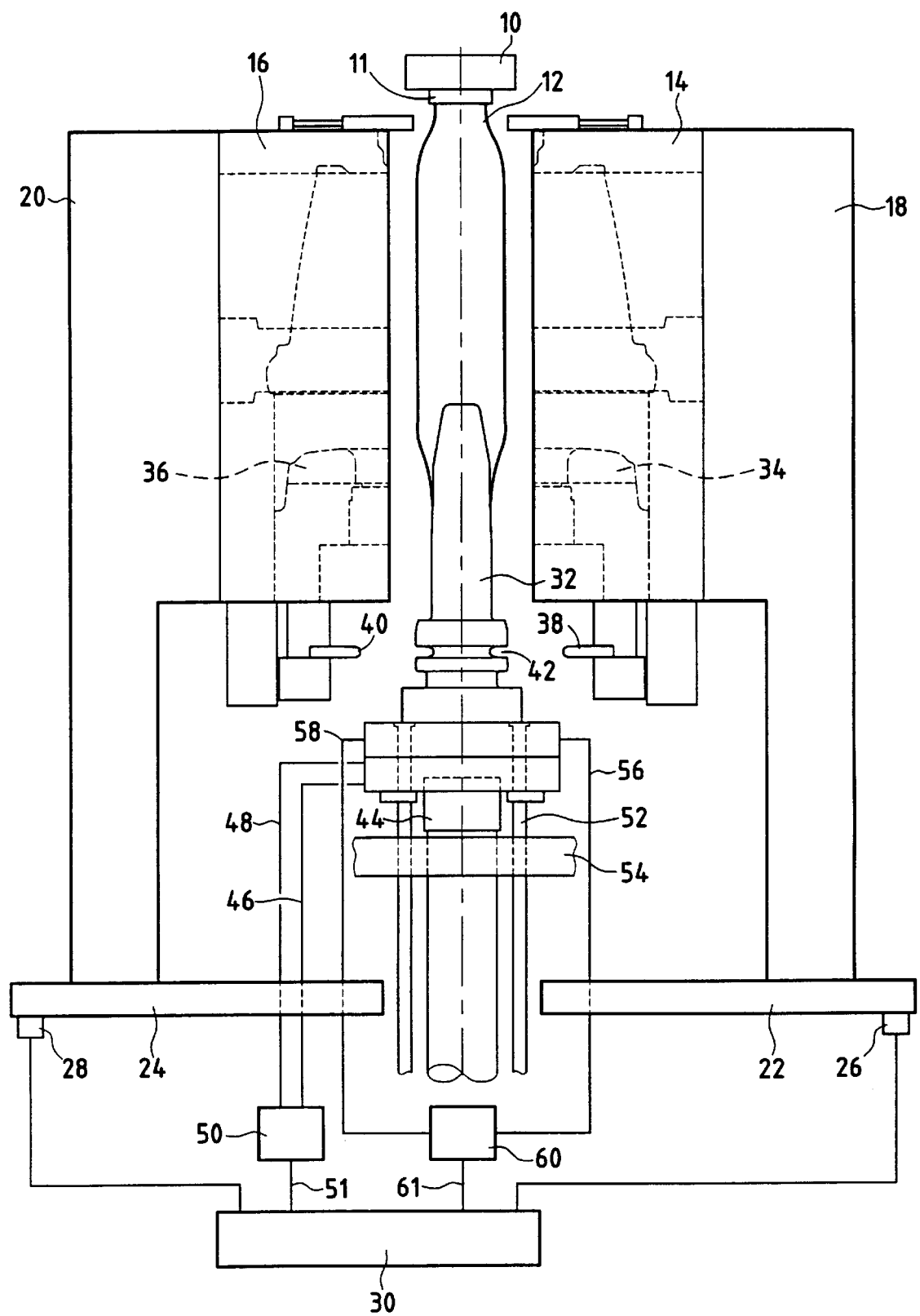
FIG. 1 is a diagrammatic overall view of apparatus of the invention.

The apparatus of FIG. 1 comprises an extruder 10 suitable for making a tubular parison 12 of plastics material. It also comprises a blow mold having two portions 14 and 16. They are mounted respectively on two portions 18 and 20 of a frame, which portions are carried on horizontal slideways 22 and 24. Means 26 and 28 are provided to drive the two frame portions 18 and 20 in horizontal translation on the slideways 22 and 24. These means may be constituted by actuators or by motors, for example. By way of example they are actuated using microprocessor-based control means 30 for moving the two frame portions, and thus the two mold portions 14 and 16, towards each other and apart from each other during the various steps of the method implemented by the apparatus. As explained below, these means are advantageously adjusted so as to lock the two mold portions together only at the end of the pre-blow step.

The apparatus also includes a blowpipe 32 which, once a parison 12 has been inserted into the mold and the two mold portions 14 and 16 have been at least substantially closed together, serves to blow the parison so as to give it the shape of an envelope, and finally so as to obtain an object made of blown plastics material.

The apparatus also includes a turnover piston which, in the figures, comprises two portions, respectively referenced 34 and 36. This piston is displaceable upwards inside the mold to turnover the bottom end of the envelope formed from the parison. The two piston portions 34 and 36 and the blowpipe 32 are constrained to move vertically together during this turnover movement. To this end, the two piston portions include first locking means respectively 38 and 40 suitable, when the mold is at least substantially closed, for co-operating with second locking means 42 fitted to the blowpipe.

For example, the first locking means comprise projecting fingers 38 and 40 which engage in the second locking means constituted by a groove 42. The periphery of the blowpipe is generally cylindrical in shape, so the groove can be annular, in which case the fingers 38 and 40 can have respective ends that are in the shape of circular arcs, e.g. each extending over about one-fourth of a circle. Since the fingers 38 and 40 and the groove 42 are situated in the same horizontal plane when the blowpipe 32 and the two piston portions 34 and 36 are in the low position, the fingers engage naturally in the groove 42 when the two piston halves are moved together. The two piston portions are then constrained to move vertically together with the blowpipe, such that it suffices for the blowpipe to be mounted on vertical displacement means to drive the entire assembly constituted by said blowpipe and the two piston portions. Alternatively, provision could be made for each piston half to be mounted on respective vertical displacement means, with the blowpipe following the vertical movements of the two piston portions once the locking means have been engaged.

In FIG. 1, the blowpipe is mounted on a hydraulic actuator 44 having oil-feed and oil-exhaust ducts 46a and 48 connected thereto, which ducts are themselves connected to a hydraulic circuit 50. Guide rods 52 sliding in a support 54 can be provided to guide vertical displacement of the blowpipe, which displacement entrains the two piston portions with the blowpipe.

The blowpipe is also connected to ducts 56 and 58 connected to a compressed air feed circuit 60.

The flow of air or oil through the various ducts can be controlled by electrically-operated valves or the like, themselves under the control of the microprocessor 30. This option is represented diagrammatically by connecting the oil circuit 50 and the air circuit 60 to the microprocessor 30 via respective electric control lines 51 and 61. The microprocessor thus controls the sequencing of the various steps of the method as shown in FIGS. 2 to 6.

Figure 2:
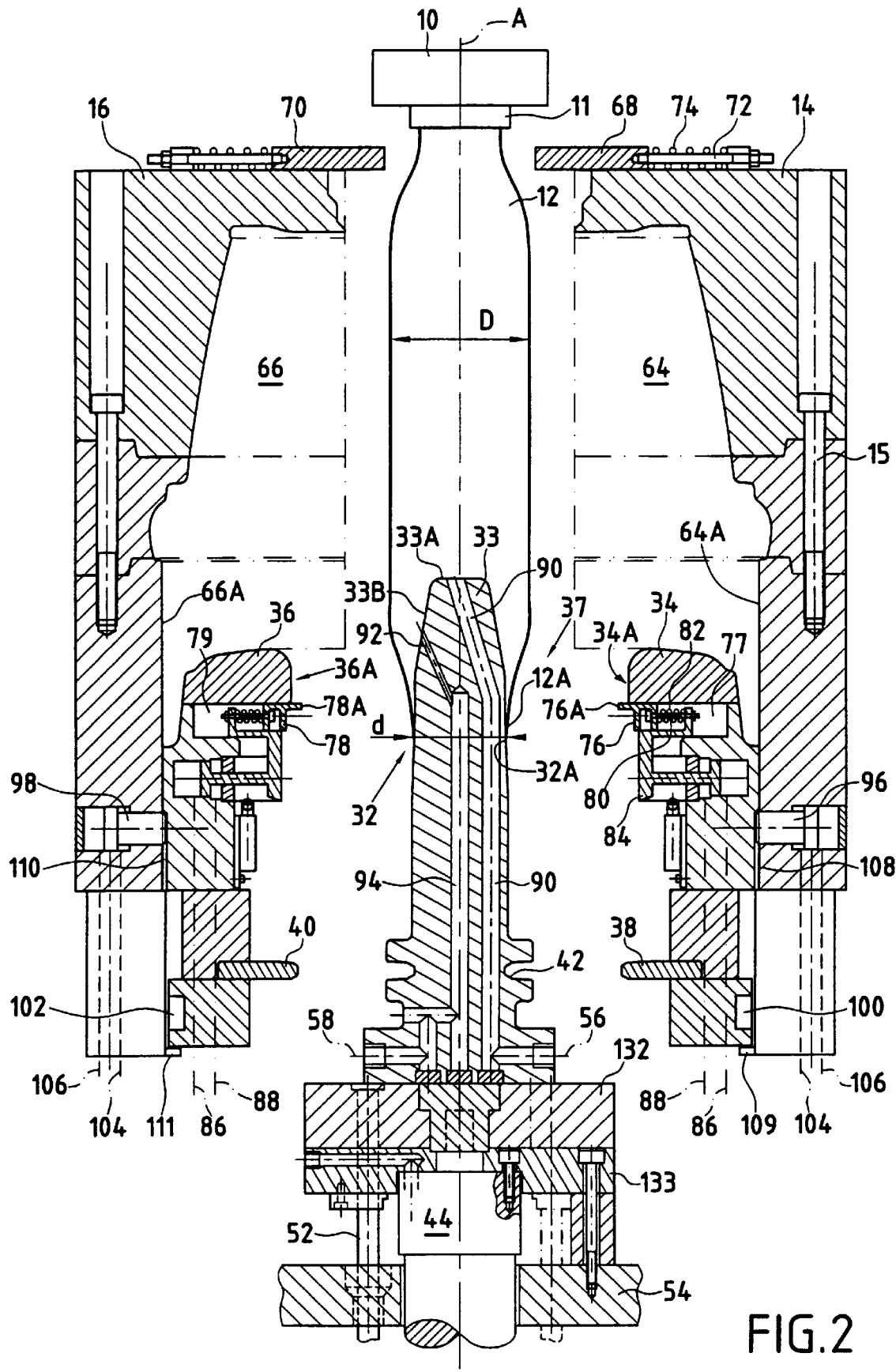
FIG. 2 is a vertical section of the central portion of the apparatus, showing a first step of the method of the invention.

The description begins with FIG. 2 which is more detailed than the following figures. It can be seen that the blowpipe 32 is situated beneath the extrusion nozzle 11 and is in vertical alignment therewith. Thus, when the two mold portions 14 and 16 are spaced apart as shown in FIG. 2, the parison 12 coming from the extrusion nozzle 11 naturally fits onto the head 33 of the blowpipe 32, until the bottom end 12A of the parison comes into position against the side wall 32A of the blowpipe 32. It should be observed that the shape of the parison is substantially tubular, with its ordinary inside diameter D being slightly greater than the ordinary diameter d of the wall 32A of the blowpipe.

It should be observed that in the figures the extrusion nozzle is placed directly above the mold. Consequently, the means for inserting the parison into the mold are constituted directly by the nozzle itself. In other situations, provision could be made for an additional member for putting the parison into place, the essential point being that the blowpipe is located vertically beneath the means that insert the parison into the mold. The blowpipe 32 is placed between the two mold portions 14 and 16, and unlike the mold portions, it remains stationary while the two frame portions 18 and 20 are being moved in translation on the slideways 22 and 24. To insert the parison, the two mold portions must naturally be far enough apart to allow the parison to pass between them into the annular space 37 without touching the mold portions.

Each of the two mold portions may comprise an assembly of parts stacked on one another and held together by screws 15 or the like. These parts are machined so that the two mold portions 14 and 16 present respective hollows 64 and 66 which, when the mold is closed, together form the mold cavity. In their top portions, the shape of the hollows 64 and 66 define the outside shape of the object that is to be manufactured. For example, if the object is a plant pot, then this shape is generally frustoconical. The bottom portions of the hollows 64 and 66 have respective segments 64A and 66A which are semicylindrical in shape with vertical walls. These semicylindrical segments 64A and 66A act as guides within which the two piston portions 34 and 36 slide, each piston portion being in the form of a hollowed-out half-cylinder, with the hollow defining an "inside" wall respectively referenced 34A or 36A facing the wall 32A of the blowpipe.

Figure 3:
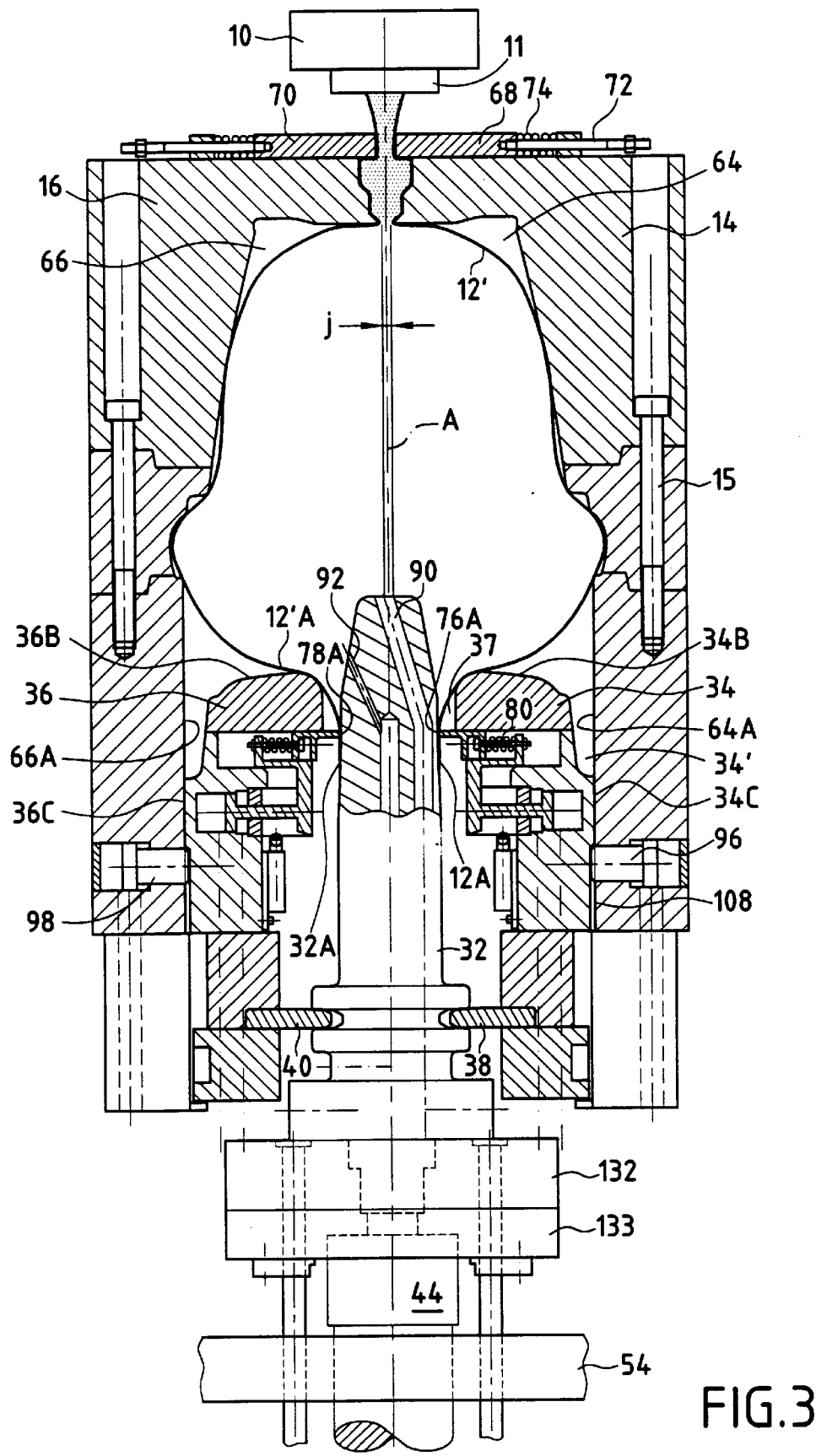
FIGS. 3 to 6 are views analogous to FIG. 2, with some elements nevertheless being drawn in outside view, and serving to show the successive steps of the method.

FIG. 2 shows the end of the first step of the method during which the parison is inserted and placed on the head of the blowpipe between the two mold portions 14 and 16 which are spaced apart. At that moment, the two piston portions 34 and 36 are spaced apart from the blowpipe such that the end 12A of the parison is naturally inserted into the annular space 37 formed between the walls 34A and 36A and the wall 32A. FIG. 3 shows a subsequent step in which the two mold portions have been moved towards each other to "close" the parison, and in which a pre-blow step has also been performed.

To close the parison, the two mold portions 14 and 16 have means in the top region of the mold for pinching the parison. More precisely, the top ends of the portions 14 and 16 are fitted with respective pinching fingers 68 and 70 which, when the two mold portions are moved towards each other to obtain the configuration shown in FIG. 3, pinch the parison against itself between their respective free ends. By comparing FIGS. 2 and 3, it can be seen that the pinching fingers initially overhang considerably from the two mold portions towards the central axis A of the blowpipe. They are mounted on resilient support means comprising, for each finger, a support rod 72 and a spring 74, so as to be capable of pinching off the parison correctly by placing their respective free ends substantially in the join plane of the mold.

For closure in the bottom region of the parison, each piston portion 34 and 36 is provided with a clamping member respectively referenced 36 and 38, the free ends (respectively 76A and 78A) thereof projecting from the respective inside faces 34A and 36A. As can be seen in FIG. 3, when the mold is substantially closed, the free ends 76A and 78A of the clamping members together form a clamping ring which clamps the bottom end 12A of the parison against the cylindrical wall 32A of the blowpipe 32. Like the pinching fingers 68 and 70, the clamping members 76 and 78 are mounted on resilient sliding means for a purpose that is explained in greater detail below, said means comprising sliding rods 80 and return springs 82, the rods urging the members into their maximally extended positions from the inside faces of the piston portions on which they are mounted, however they allow them to return a little into the corresponding piston portions 34 and 36 so as to provide appropriate clamping as a function of the movement of the piston portions towards the blowpipe. In addition, the resilient support means are themselves constrained to move radially with pistons 84 disposed in radial hollows formed in the portions 34 and 36 of the turnover piston. These hollows have chambers formed therein which are connected to ducts 86 and 88 conveying fluid under pressure, e.g. air. In FIGS. 2 and 3, these pistons 84 are shown in their position of maximum advance towards the walls 34A or 36A, in which position they enable the clamping members 76 and 78 to project from the faces 34A and 36A. For this purpose, the ducts 86 are fed with compressed air while the ducts 88 allow air to be exhausted. At the end of the method, for reasons explained below, the pistons 84 can be moved away from the axis A by feeding the ducts 88 with compressed air so as to retract the clamping members 76 and 78 into their respective housings 77 and 79.

To go from the situation shown in FIG. 2 to that shown in FIG. 3, it suffices to move the two mold portions 14 and 16 towards each other until the top end of the parison is pinched between the fingers 68 and 70 and the bottom end of the parison is clamped against the blowpipe by means of the clamping members 76 and 78, and then once the parison has been closed in this manner, a pre-blow step is performed where air is injected into the parison via the blowpipe, thereby giving the parison a pre-blown envelope shape as shown in FIG. 3.

The blowpipe 32 has an air blowing duct 90 which opens out in the top end 33A of the head 33 and connected at the base of the blowpipe to the air feed duct 56. The jet of air blown by the duct 90 is directed practically vertically upwards. The blowpipe also has one or more secondary ducts 92 (advantageously three or four of them) opening out in the side of the head, in a frustoconical portion 33B thereof. The ducts 92 lead to a bore 94 in the blowpipe which is itself connected at the base of the blowpipe to an air feed duct 58. The supply of air to the ducts 56 and 58 and possibly also the exhausting of air via said ducts is controlled by the circuit 60 which includes a source of compressed air, and optionally also by electrically-controlled valves or exhaust valves whose operation can be controlled by the microprocessor 30 via the control line 61.

Once the two mold portions 14 and 16 have been substantially closed together as shown in FIG. 3, compressed air is injected via the duct 90 so as to perform a pre-blow step, at the end of which the parison 12 is shaped to constitute a pre-blown envelope 12'.

As can be seen in FIG. 3, at least a portion of the periphery of the envelope is to be found in the vicinity of the walls of the mold (walls of the cavities 64 and 66) but it is not pressed against these walls, at least not over the full length thereof. Furthermore, the bottom end 12'A of the envelope is in the vicinity of the top end of the turnover piston. Nevertheless, the bottom end portion 12'A is not inserted in the annular space 34' provided between the piston 34, 36 and the cylindrical walls 64A and 66A of the mold. For example, this bottom end 12'A rests on a small portion of the top ends 34B and 362 of the two piston portions 34 and 36. It can be seen that the shape of the bottom end 12A of the parison is unchanged and that it remains clamped against the blowpipe 32.

The pre-blown envelope is thus substantially pear-shaped, and at the end of the pre-blow step, the pressure inside the envelope is of the order of 1 bar to 4 bars (e.g. 2.2 bars for parisons of average thickness of about 5 mm to 6 mm). To avoid going beyond the pre-blowing stage and pressing the envelope against the mold walls, the rate at which air is fed to the duct 90 during the pre-blow step is advantageously limited by a flow rate limiter.

In FIG. 3, it can be seen that clearance j is maintained between the two mold portions 14 and 16 in the join plane. Throughout the pre-blow step, the mold is left in an unlocked state leaving a gap through which air can escape between the two mold portions. In the example shown, this gap is provided because of the existence of the clearance j. It constitutes simple means for allowing the air pushed back by the envelope 12 while it is being pre-blown to escape from the mold cavity. The clearance j is small, advantageously being about 1 mm to 2 mm so as to avoid any tendency of the parison to jam between the two mold portions during the pre-blow step. To obtain the clearance j, the two mold portions are merely allowed to come into contact with each other without being locked together.

Figure 4:
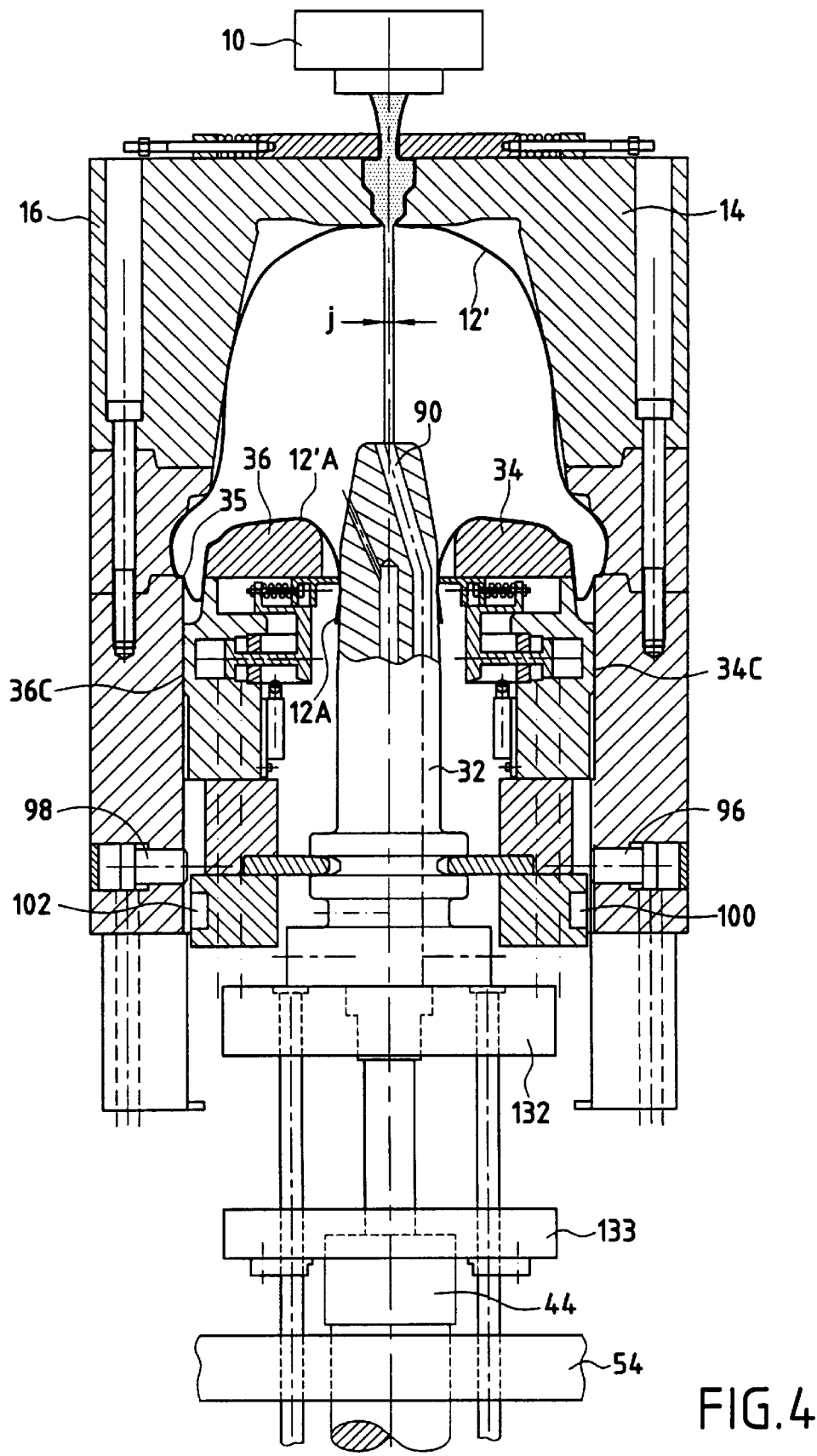

Once the pre-blow step has been completed, a turnover step is performed as shown in FIG. 4 where the piston is shown in an intermediate position where turning over is incomplete. Initially, starting from the position in FIG. 3, the two piston portions 34 and 36 are locked onto the blowpipe, with the fingers 38 and 40 engaging in the groove 42. To perform the turnover step proper, the actuator 44 which carries the blowpipe is actuated so as to move the blowpipe upwards, thereby taking the two piston portions 34 and 36 upwards with it. In this way, during the turnover step, the blowpipe forms a central core of the turnover piston, which is thus constituted by three portions: the blowpipe 32 and the two portions 34 and 36. When the piston rises in the mold cavity, the top ends 34B and 36B of the two piston portions 34 and 36 carry the bottom end 12'A of the pre-blown envelope which little by little takes up the shape of a collar placed inside the envelope 12'.

The above-mentioned clearance j is particularly advantageous during the turnover step. The mold is made in such a way that the outside peripheries 34C and 36C of the two piston portions 34 and 36 are disposed without clearance inside the bottom portions 64A and 66A of the hollows 64 and 66 when the two mold portions are locked together. This makes it possible to guarantee sealing of the mold cavity in order to perform the final blow step. By maintaining the clearance j during the turnover step, functional clearance is provided between the outside peripheries 34C and 36C of the bottom portions of the hollows 64 and 66 to allow the piston to slide without difficulty in the mold.

During the turnover step, the inside volume of the envelope 12' decreases. Advantageously, in order to avoid raising the pressure excessively inside the envelope during the turnover step, which would cause the envelope to fit closer to the walls of the cavity and could make the turnover operation more difficult to perform, the inside space of the envelope is connected to an air exhaust duct. For example, the duct may be constituted by the above-mentioned duct 90, with an air exhaust valve under the control of the microprocessor 30 being placed on the duct 56. This ensures that sufficient air is exhausted to avoid raising the pressure excessively, while the rate at which the air is exhausted is under control so as to maintain substantially constant pressure inside the envelope, thereby avoiding excessive loss of pressure which could compromise the success of the method.

In a variant, instead of allowing air to escape during the turnover step, the increase in the pressure of the space inside the envelope that results therefrom is used on the contrary to initiate the blow step, since said increase in pressure contributes to pressing the envelope against the walls of the mold. In this variant, it is important to control very accurately the speed at which the piston moves relative to the air flow rate so as to avoid the pressure rising excessively and harming turnover.

It will be observed that in the example shown, the "join plane" 35 between the turnover piston and the mold cavity lies in a middle portion of the top rim of the object that is being manufactured (which rim faces downwards while it is being blown). Thus, the walls of the hollows 64 and 66 form an outside portion of the rim of the object while the outside periphery of the piston portions 34 and 36 form an inside portion of said rim.

Figure 5:
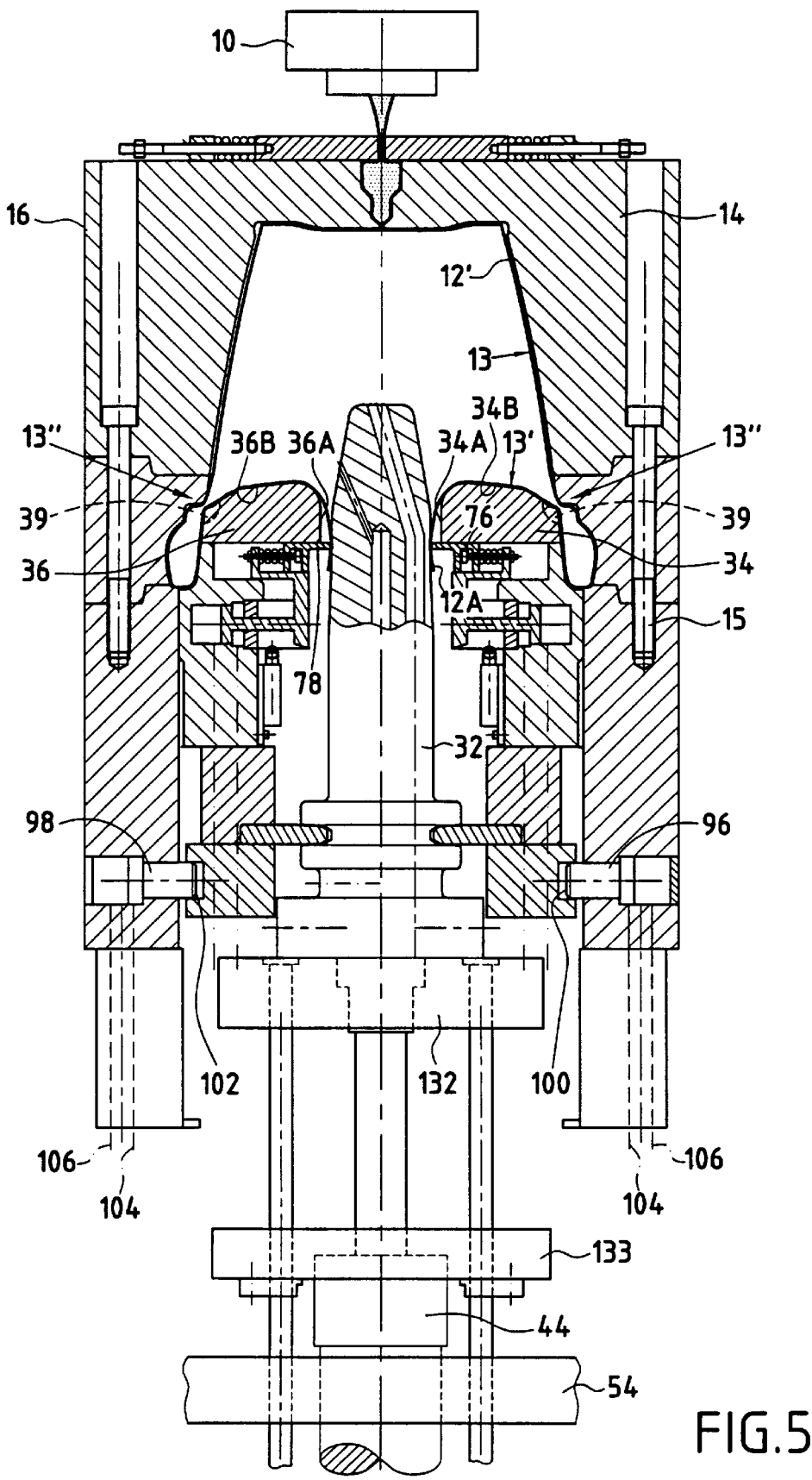

At the end of the turnover step, the configuration shown in FIG. 5 is reached in which the turnover piston (the blowpipe 32 plus the portions 34 and 36) occupies its high position. This figure shows the situation almost at the end of the blow step, since the duct 90 has again been used to inject air so as substantially to confer the final shape to the envelope which is practically closely pressed against the walls of the mold cavity. At the end of blowing it will be pressed against the walls of the cavity defined by the hollows 64 and 66 and by the tops of the piston portions 34 and 36, said tops comprising the top ends 34B and 36B of the piston portions together with fractions of their respective peripheries. All the way to the clamping members 76 and 78, the envelope is likewise pressed against the inside walls 34A and 36A of the piston portions 34 and 36.

To perform the final blow step, the mold is closed completely, i.e. the above-mentioned clearance j is eliminated. For this purpose, means are used to lock together the two mold portions 14 and 16. The locking means are advantageously controlled so as to be capable of being put into operation only when the turnover piston is in its high position inside the mold. For example, the locking means comprise locking fingers and complementary locking cavities that come into register with each other only when the piston is in its high position. Thus, in the example shown, the locking fingers 96 and 98 occupy respective mold portions 14 and 16 and are to be found in the bottom regions 64A and 66A of the hollows 64 and 66, while the locking cavities 100 and 102 in which these fingers can be engaged are to be found on the outside periphery of the piston portions 34 and 36 in the vicinity of the bottom ends thereof.

As can be seen in FIG. 5, is only when the cavities have reached the horizontal plane of the locking fingers that the fingers can be engaged therein. To achieve locking, the locking fingers may be made in the form of actuators, e.g. hydraulic actuators, which slide in chambers connected to fluid feed and exhaust ducts 104 and 106. To actuate the fingers 96 and 98 in the locking direction, the ducts 106 are fed with fluid under pressure and the ducts 104 allow fluid to be exhausted. Fluid flow takes place in the opposite direction to unlock and disengage the fingers from the cavities 100 and 102.

It will be observed that the free ends of the fingers 96 and 98 always project to a small extent towards the axis A from the bottom portions 64A and 66A of the hollows 64 and 66. The outer peripheries of the piston portions 34 and 36 have respective grooves 108 and 110 in which the free ends of the fingers engage. These grooves are naturally shallower than the above-mentioned cavities 100 and 102. In this way, the free ends of the fingers co-operate by coming into abutment with the top ends of the grooves 108 and 110 so as to define the bottom positions of the piston portions 34 and 36, i.e. the position shown in FIG. 2, for example.

In complementary or alternative manner, the bottom positions of the piston portions 34 and 36 can be defined by said piston portions resting in abutment, e.g. via their bottom ends, on projections 109 and 110 projecting from the mold portions.

The blowpipe 32 reaches its bottom position when its base 132 is resting on the fixed support or table 133.

These bottom positions correspond so that the fingers 38 and 40 lie in the same plane as the groove 42.

The turned-over portion of the envelope 12' serves to form a turnover in the region of the free edge of the object being manufactured. Thus, the envelope 12' has a non-turned-over portion 13 and a turned-over portion 13'. The turnover of the object is formed by a substantially vertical region of the turned-over portion 13'. As can be seen in FIG. 5, the portions 13 and 13' are sealed together in a region 13". At the end of the turnover step, the turned-over portion of the envelope is sealed to the non-turned-over portion. This is due merely to the fact that the sealed portion 13" corresponds to a circumference where the portions 13 and 13' come into contact since in this region the outer peripheries of the piston portions 34 and 36 are very close to the cavity walls 64 and 66 and come almost into contact therewith, while nevertheless avoiding compressing the envelope.

The presence of this seal zone 13" is particularly advantageous since once the object has been unmolded, it suffices to cut off the turned-over portion 13' immediately beneath the seal zone 13" so as to obtain an object having a closed turnover. If the object is designed to contain a substance such as earth, this avoids any substance getting in under the turnover at the free edge of the object, e.g. when it is turned upside-down to be emptied.

In spite of the presence of the line of heat sealing, it is advantageous to make sure, during blowing, that the pressure of air beneath the turnover is sufficient to shape the free edge zone of the object properly. For this purpose, while sealing the turned-over portion 13' of the envelope to the portion 13, at least one air passage is provided between said turned-over and the non-turned-over portions. This air passage is implemented merely by providing the outer periphery of the piston portions 34 and 36 with one or more notches 39, specifically in the region where the edge of the piston is normally closest to the walls of the hollows 64 and 66. In this zone, the turned-over portion of the envelope comes against the bottoms of the notches and therefore does not come into contact with the non-turned-over portion.

It is mentioned above that the clamping members 76 and 78 are mounted on resilient supports constituted by the rods 80 and the springs 82. This configuration has the particular advantage of the resilient means urging the clamping members against the blowpipe so as to ensure that the bottom end of the envelope is properly held in place during the pre-blow step and during the turnover step, during which steps the clearance j between the two mold portions is maintained. By mounting the clamping members on resilient means, it is possible to ensure that it is possible to lock the two mold portions together, i.e. to eliminate the clearance j, since that merely compresses the springs 82.

Figure 6:
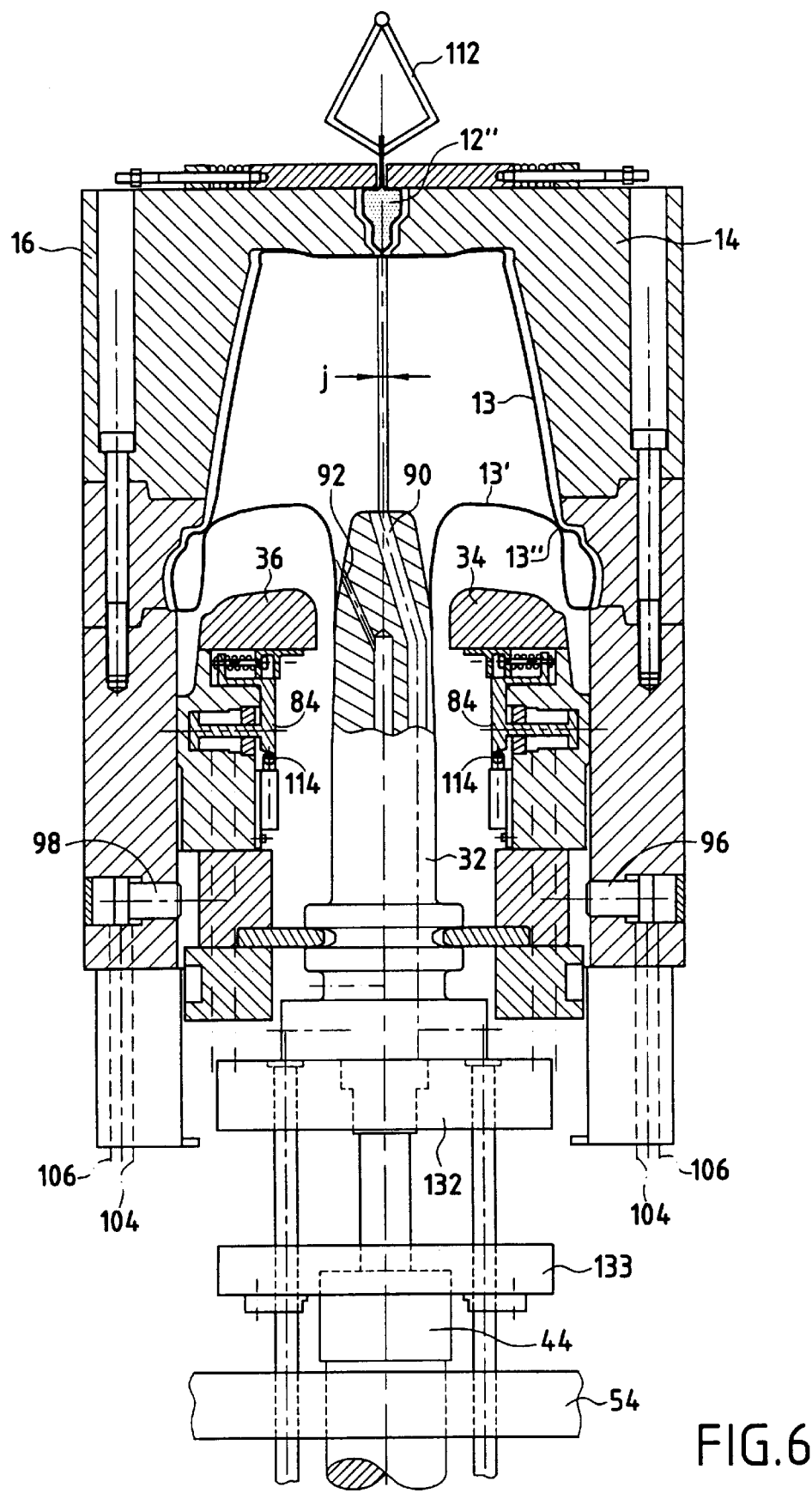

FIG. 6 shows a final step of the method, at the end of which the object formed in the mold is ready for unmolding. To perform this step, the assembly constituted by the blowpipe 32 and the two mold portions 34 is lowered inside the mold cavity, and then the object which has just been manufactured is grasped, e.g. by means of tongs 112, prior to moving the two mold portions apart so as to release said object and be in a position to take it away from the manufacturing zone. For example, the tongs 112 may take hold of the end of the parison situated immediately above the pinching fingers 68 and 70. Naturally, the displacement and the actuation of the tongs can also be under the control of the micro-processor 30.

At that time, the mold can be displaced sideways so as to be taken away from the outlet of the extruder, thereby giving access to the tongs 112.

To make it possible to lower the assembly constituted by the blowpipe and the two piston portions inside the mold, it is necessary for the locking fingers 96 and 98 to have been released from the cavities 100 and 102. Also, to allow the outer periphery of the piston portions to slide relative to the bottom portions 64A and 66A of the hollows 64 and 66, the two mold portions are moved very slightly apart, e.g. back to the above-mentioned clearance j.

Also, during this downward movement, it is naturally preferable for the clamping members 76 and 78 to have ceased their clamping action on the bottom end 12A of the parison so as to avoid taking it downwards. It is therefore necessary to avoid starting the descent of the piston inside the mold cavity until it is certain that the clamping has ceased. For this purpose, the pistons 84 carrying the clamping members 76 and 78 are urged to retract into the walls of the piston portions, with this being driven by feeding the ducts 88 with fluid under pressure. The descent of the turnover piston is not started until its support pistons 84 have reached their retracted positions. To be certain of this, position sensors 114 are advantageously placed on the path of these pistons, which sensors may be optical or, as in the example shown, they may be contact sensors having top ends co-operating with the bottom ends of the pistons 84. When they detect the presence of the pistons 84, the detectors 114 issue a signal which is received by the microprocessor 30 and authorizes it to start descending the return piston inside the mold cavity.

Finally, it should be observed that the above-mentioned secondary air-blowing ducts 94 and 92 are advantageously used at the end of the blow step, immediately prior to unmolding. Cold air can be injected via these ducts from the duct 58, thereby cooling the inside of the part which has just been molded so as to ensure that its shape remains stable during unmolding. To sweep out the entire inside space of the part, it is advantageous for the secondary ducts 92, as mentioned above, to extend through a frustoconical portion of the blow head. They can continue to blow cold air throughout the descent of the turnover piston. After unmolding, the turned-over portion 13' is cut off immediately below the seal zone 13" (i.e. immediately above said zone 13" in the position shown in FIG. 6), and the unused portion 12" of the parison 12 is cut off from beneath the bottom of the manufactured object.

Figure 7:
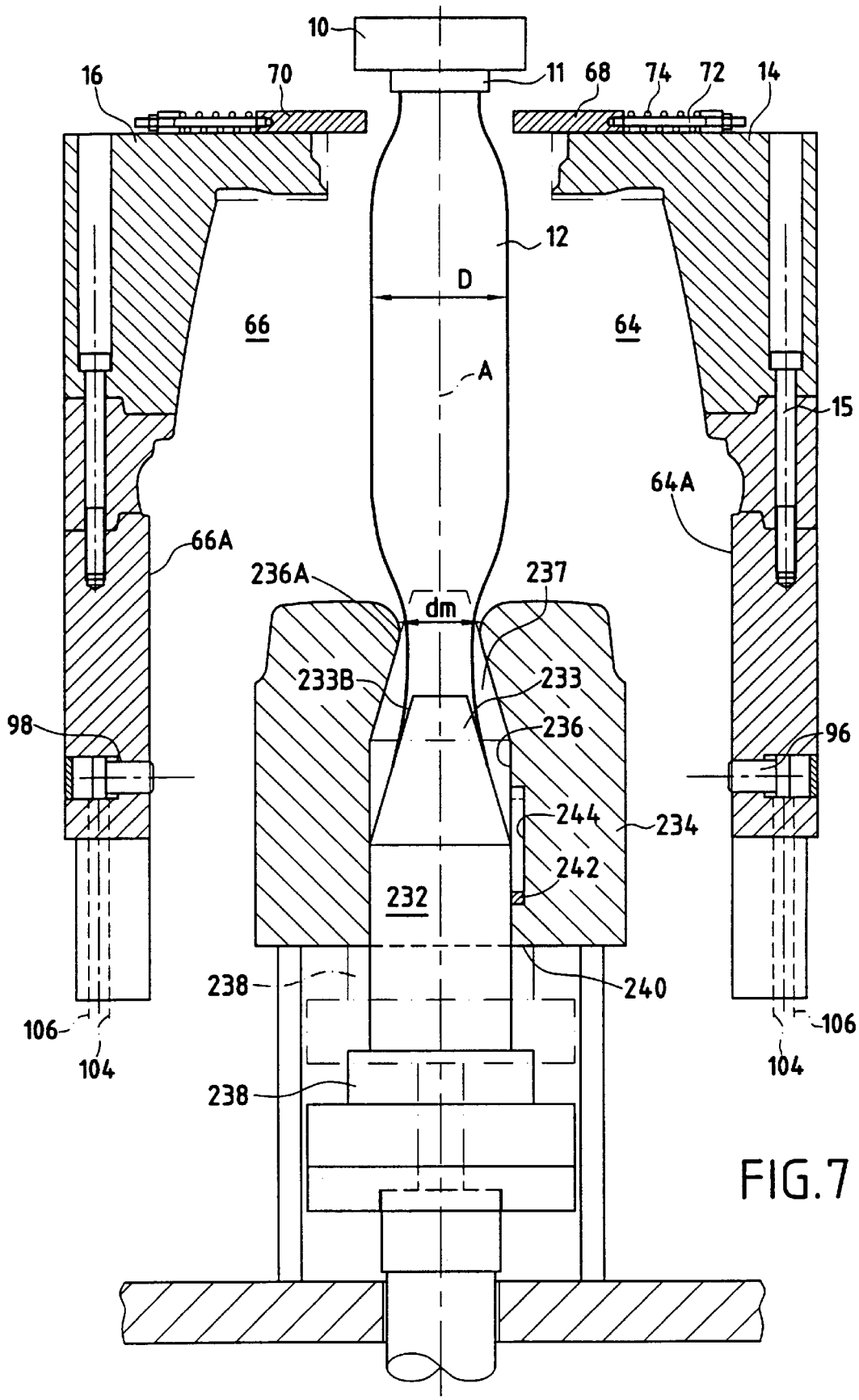
FIGS. 7 and 8 are views analogous to FIGS. 2 and 6 showing a variant of the apparatus of the invention, respectively in an initial step and in a final step of the method.
Figure 8:
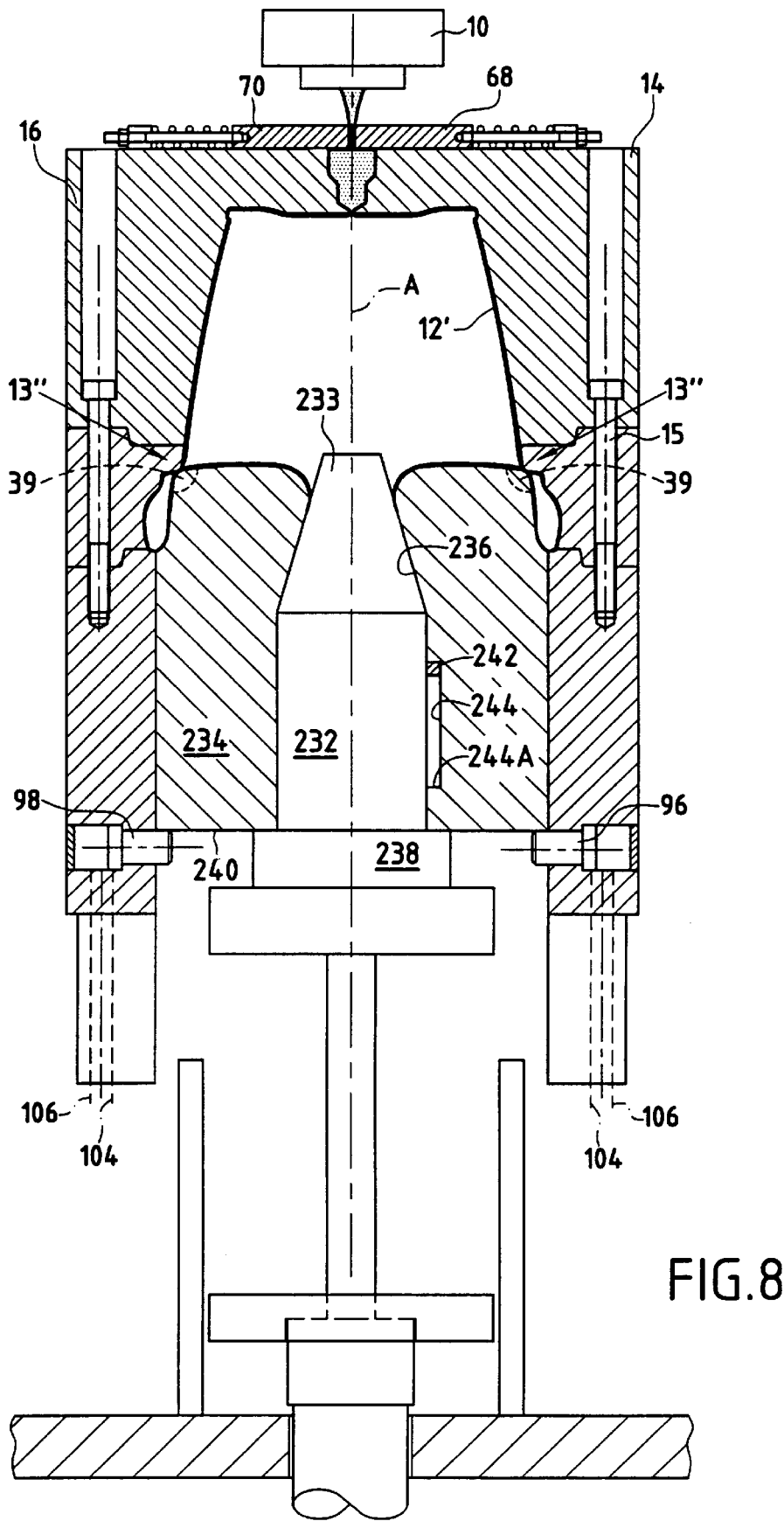

In FIGS. 7 and 8, elements that are unchanged compared with FIGS. 1 to 6 are given the same reference numerals as in those figures.

The variant of FIGS. 7 and 8 differs essentially from the preceding figures in the structure of the turnover piston. This piston has a piston portion 234 that is generally in the form of a cylinder that is axially hollowed out in its center. The blowpipe 232 is disposed in the axial hollow 236 of said piston portion. The shape of said portion is substantially the same as that defined by the piston portions 34 and 36 of the preceding figures when they are in their closest-together position.

The head 233 of the blowpipe has a frustoconical outline 233B of upwardly tapering diameter. The wall of the hollow 236 has a top end portion 236A that is also frustoconical of diameter that also tapers upwards.

In FIG. 7, the blowpipe 232 is in its low position, leaving an annular space 237 between the zones 233B and 236A of the head 233 and of the hollow 236 for receiving the bottom end of the parison. It should be observed that the minimum diameter dm of the wall 236A is greater than the diameter of the bottom end of the parison. Nevertheless, it is not always necessary for the diameter dm to be greater than the ordinary diameter D of the parison since under the effect of gravity and of its speed of insertion into the mold, the parison generally has a diameter at its bottom end that is smaller than its ordinary diameter.

Once the bottom end of the parison has been placed in the annular space 237, the blowpipe rises up the hollow 236 to reach its high position as shown in dashed lines in FIG. 7, in which position it clamps the bottom end of the parison against the wall of the hollow 236.

In this situation, the two mold portions are moved towards each other until they occupy the same position as that shown in FIG. 3 relating to the first variant, in which the pre-blow step is performed.

To perform the turnover step, the blowpipe is suitable for taking the piston portion 234 with it when moving further up. For this purpose, it has a shoulder 238, for example, suitable for co-operating with the piston portion 234 by coming into abutment against the bottom end 240 thereof.

Blowing is performed as described with reference to the preceding figures which relate to the first variant.

FIG. 8 shows the situation at the end of the blow step, the blowpipe 232 and the piston portion 234 then still occupying their high position.

The above-mentioned fingers 96 and 98, or any equivalent system, prevent the mold from closing completely for blowing purposes until the piston assembly has reached its high position (said fingers engaging, for example, beneath the bottom end 240 of the piston portion 234).

For unmolding, after the fingers 96 and 98 have been unlocked, the blowpipe 232 is lowered inside the hollow 236 so as to release the bottom end of the parison. Thereafter, possibly after opening the mold a little to facilitate sliding of the piston portion 234, the assembly constituted by the blowpipe 232 and said piston portion 234 is lowered relative to the bottom portions 64A and 66A of the hollows 64 and 66 of the mold portions, until said assembly has returned to its initial low position.

A system is provided to ensure that the blowpipe 232 takes the piston portion 234 down with it as it descends. Thus, for example, the outer axial periphery of the blowpipe (which is shown in outside view only to simplify the drawings) is provided with a peg 242 that projects outwards and that is engaged in a longitudinal slot 244 in the wall of the hollow 236. The length of the slot allows the blowpipe to move in the piston portion 234 as described above. When the blowpipe is moved downwards, starting from the position of FIG. 8, the peg 242 comes into abutment against the bottom end 244A of the slot 244, thereby entraining the piston portion 234 downwards.

The mold is then opened and the molded object is extracted therefrom.

What is claimed is:

1. A method of manufacturing a container-forming object out of plastics material, wherein the method comprises:

(a) inserting a parison into a blow mold, having at least two mold portions suitable for being moved relative to each other to open and close the mold, in an open situation thereof by placing a bottom end of said parison on a head of a blowpipe situated between the two mold portions which are spaced apart in said open situation, (b) moving the two mold portions towards each other to close the mold at least substantially, the parison being pinched in a top region of the mold, and the bottom end of said parison being clamped against the blowpipe in a bottom region of the mold, (c) performing a pre-blow step to obtain a pre-blown envelope having at least a portion of a periphery of the pre-blown envelope in the vicinity of walls of the mold without being pressed thereagainst, said pre-blown envelope having a bottom end portion in the vicinity of a top end of a turnover piston while being remote from the walls of the mold, (d) performing a turnover step by displacing the blowpipe together with the turnover piston upwards to turn the bottom end of the pre-blown envelope over onto itself forming a free edge that presents a turned over portion, and (e) performing a final blow step to obtain a blown envelope having the shape of the container-forming object.

2. The method according to claim 1, wherein during the turnover step, the pre-blown envelope has an inside space that is connected to an air exhaust duct.

3. The method according to claim 1, wherein during the pre-blow step, the blow mold is left in an unlocked state, an air exhaust gap being left between the mold portions.

4. The method according to claim 1, wherein the turnover piston comprises two piston portions disposed around the blowpipe and displaceable relative to each other, wherein during insertion of the parison into the blow mold, the two piston portions are held apart, thereby leaving a substantially annular space between the blowpipe and said piston portions, and the bottom end of the parison is placed on the head of the blowpipe by inserting said bottom end into said space, and wherein the two piston portions are then moved towards each other to press them against the blowpipe, thereby clamping the bottom end of the parison against said blowpipe.

5. The method according to claim 1, wherein the turnover piston comprises a piston portion in the form of a hollow cylinder, the blowpipe being disposed in a hollow of said portion and at least one of the two elements constituted by the head of the blowpipe and the said hollow has diametral dimensions that taper upwards, wherein while the parison is being inserted in the mold, the blowpipe is held in a low position in which a substantially annular gap is left between the head of said blowpipe and a wall of said hollow, and the bottom end of the parison is placed on the head of the blowpipe by inserting said bottom end into said space, and wherein thereafter the blowpipe is raised in the hollow of the piston portion to clamp the bottom end of the parison between the wall of the hollow and the head of the blowpipe.

6. The method according to claim 1, wherein at the end of the turnover step, the turned-over portion of the pre-blown envelope is sealed to a non-turned-over portion of said envelope.

7. The method according to claim 6, wherein while sealing the turned-over portion of the pre-blown envelope to the non-turned-over portion of said envelope, at least one passage is left for air between said turned-over and non-turned-over portions.

8. An apparatus for manufacturing a container-forming object out of plastics material, the apparatus comprising means for making a parison of plastics material, a blow mold having at least two portions suitable for being moved relative to each other to open and close the mold, means for inserting the parison into the mold, a blowpipe, and a turnover piston suitable for being moved inside the mold to form a turnover in the region of a free edge of the container-forming object, wherein the blowpipe is disposed beneath the means for inserting the parison into the mold and is to be found between the two mold portions, the blowpipe having a blowpipe head suitable for receiving a bottom end of the parison when the mold is open, wherein the apparatus includes means for pinching the parison in a top region of the mold, and means for clamping the bottom end of said parison against the blowpipe in a bottom region of the mold, wherein the blowpipe is suitable for being used to perform a pre-blow step so as to obtain a pre-blown envelope having at least a portion of its periphery in the vicinity of walls of the mold which is at least substantially closed, but without being pressed against said walls, said envelope having a bottom end portion in the vicinity of a top end of the turnover piston while being at a distance from the walls of the mold, wherein the blowpipe is suitable for being moved upwards together with the piston to turn the bottom end portion of the pre-blown envelope over onto itself, and wherein the blowpipe is suitable for being used to perform a final blow step in such a manner as to obtain a blown envelope having the shape of the container-forming object.

9. The apparatus according to claim 8, including means for connecting a space inside the pre-blown envelope to an air-exhaust duct.

10. The apparatus according to claim 8, including means for causing the mold to be closed, and adjusted to lock the two mold portions together only at the end of the pre-blow step.

11. The apparatus according to claim 8, wherein the turnover piston has two portions disposed around the blowpipe, said two portions being suitable for being spaced apart to leave a substantially annular space around the blowpipe suitable for receiving the bottom end of the parison when it is placed on the head of the blowpipe, and suitable for being moved towards each other to clamp the bottom end of the parison against said blowpipe.

12. The apparatus according to claim 11, wherein each of the two portions of the turnover piston has a clamping member, said clamping members together forming a clamping ring which projects towards the blowpipe to clamp the bottom end of the parison against said blowpipe.

13. The apparatus according to claim 12, wherein the clamping members include means for urging them to project resiliently towards the blowpipe.

14. The apparatus according to claim 8, wherein the turnover piston has a piston portion in the form of a hollow cylinder, the blowpipe being disposed in a hollow of said piston portion, and at least one of the two elements constituted by the head of the blowpipe and by said hollow has diametral dimensions that taper upwards, wherein the blowpipe is suitable for occupying a low position in which an annular space is left between said head and a wall of the hollow of the piston portion, which space is suitable for receiving the bottom end of the parison when it is placed on the head of the blowpipe, and is suitable for occupying a high position in said hollow to clamp the bottom end of the parison between the wall of said hollow and said head of the blowpipe.

15. The apparatus according to claim 8, including means for causing the turnover piston and the blowpipe to be constrained to move together in vertical displacement.

16. The apparatus according to claim 8, including means for locking the two mold portions to each other and suitable for being implemented only when the turnover piston and the blowpipe occupy a high position inside the mold.

* * * * *